March 27, 1962     O. HÜBNER     3,027,507

POWER PACK MEANS FOR ELECTRICAL APPLIANCE

Filed Jan. 9, 1957

INVENTOR.
OTTO HÜBNER
By David H. Semmes
ATTORNEY

United States Patent Office 3,027,507
Patented Mar. 27, 1962

3,027,507
POWER PACK MEANS FOR ELECTRICAL APPLIANCE
Otto Hübner, Gruental 33, Munich, Germany
Filed Jan. 9, 1957, Ser. No. 633,276
Claims priority, application Germany Jan. 10, 1956
8 Claims. (Cl. 320—2)

This invention relates to improvements in electric shavers, and more particularly to a battery-operated electric shaver having means for permitting the battery to be charged from line current.

Electric shavers are known which have low-voltage motors energized by dry-cell batteries contained within the shaver housing. The dry-cell batteries of such shavers do not have a long life, however, and must be frequently replaced. This is cumbersome and annoying to the users, and does not meet the practical requirement that the shaver be always in good working order and available for use independently of the available line voltage.

It is an object of the present invention to provide an electric shaver having a built-in storage battery, and containing means for re-charging the storage battery as required. The battery is preferably a semi-dry storage type consisting of several gastight cells connected in series and adapted to supply low voltage, for example 6 volts, to the shaver motor.

Another object of the invention is the provision of an electric shaver of the character described in which the battery is adapted to be charged from the usual line current in houses, and further may be charged, equally effectively, from lines having wide variances in voltage. For this purpose, a current limiting condenser is used in the charging circuit within the shaver housing, to permit the shaver unit to be connected to an alternating current line source of any standard voltage for re-charging, without the necessity of switching.

Still another object of the invention is the provision of an electric shaver of the character described, in which terminal prongs are mounted directly on the shaver housing, thereby enabling the shaver to be plugged directly into a wall socket for purposes of recharging its contained storage battery. For this purpose, the shaver is provided with means of covering up the terminal prongs when the shaver is in use. These means may comprise a cover or cap which ordinarily forms part of the housing as a continuous wall portion thereof. Alternately, the terminal prongs may be slidably mounted for retraction within the housing when not in use for re-charging. Means may be provided to cooperate with the terminal prongs to break the motor circuit when the terminal prongs are extended for re-charging. This prevents the shaver from being inadvertently operated during the re-charging process, and it is made impossible for the user to physically contact the line voltage through faulty insulation or the like.

A further object of the invention is the provision of a slider arrangement in the shaver housing for extending or retracting the terminal prongs, which slider is constructed to be brought to two operative positions in the first of which the terminal prongs are extended sufficiently to be inserted into a normal wall socket, and in the second of which the terminal prongs are further extended for insertion within a safety socket of the type having deeply embedded contacts. This slider arrangement also permits the shaver to be equipped with flat terminals as well as round or cylindrical terminals for universal use in re-charging with any type of wall socket.

Additional objects and advantages of the invention will become apparent during the course of the following specification when taken in connection with the accompanying drawings, in which.

Figure 1:
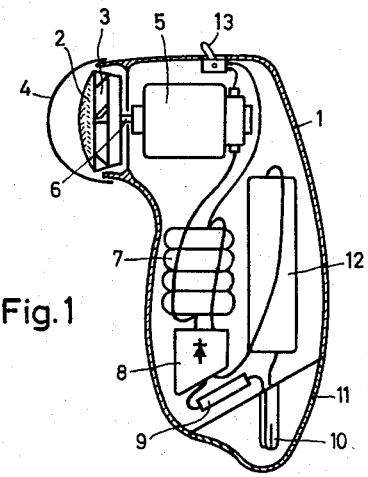
FIG. 1 is an elevational view of an electric shaver made in accordance with the invention, with the housing wall broken away to reveal interior parts.

Referring to FIG. 1, the electric shaver shown therein has a housing 1 mounting on its upper end a shaving head 2 with circular knives or cutting members 3, the latter being protected by a perforated cap 4. The shaving head 2 is driven by an electric motor 5, which may, for example, be a six volt motor. A switch 13 is provided for energizing and de-energizing the motor 15. The drive shaft 6 of the motor 5, which is connected to the cutting head 2, is made of insulating material to prevent the body of the user from contacting electrically-charged shaver parts.

The housing 1 also contains a storage battery or accumulator 7 consisting of several gastight cells connected in series. The storage battery 7 is connected through switch 13 to the motor 5 for energization of the latter.

The charging unit for the storage battery 7 comprises a bridge rectifier 8, the output lines of which are connected to the storage battery 7, and the input lines of which are connected to a pair of terminal prongs 10 through a condenser 12 and resistor 9. The terminal prongs 10 are fixedly mounted in the bottom wall of the shaver housing 1 and are simply plugged into a line outlet, as, for example, a wall socket for re-charging the battery 7. During the re-charging operation, the switch 13 may be actuated to disconnect the motor 5 from the battery 7.

The terminal prongs 10 project outwardly of the bottom wall of housing 1. A hollow cover piece or cap 11 is removably secured, as by a press-fit, to the bottom end of the housing 1, to cover up the terminal prongs 10 when the shaver is not in use, or is being used in shaving. The cover piece 11 is shaped to form a continuous extension of the housing 1 when in its mounted position.

Figure 2:
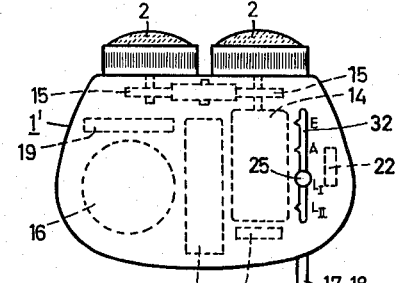
FIG. 2 is an elevational view of a different type of shaver having two shaver heads, with the interior parts shown in phantom.

In FIG. 2, there is illustrated a shaver having a housing 1' with a pair of cutting heads 2 which are driven by a motor 14 through gears 15. As in the previous embodiment, the energizing power for the motor 14 is supplied by a storage battery 16 which may, by way of example, consist of several disc-shaped, gastight storage cells connected in series. The battery charger unit comprises terminal prongs 17 and 18, bridge rectifier 19, condenser 20, and resistors 21 and 22. The electrical circuit is shown in detail in FIG. 3, and will be presently described.

The terminal prongs 17 and 18 are mounted on a slider block 24 which is slidably mounted in the housing 1'. The block 24 has a projecting finger button 25 which extends through a housing slot 32 exteriorly of the housing 1' for manually moving the slider block 24 to various set positions, as will be described hereinafter. The block 24 carries a conductive plate or bar 23 which serves to break the motor circuit when the slider block 24 is in a set position in which the terminal prongs 17, 18 project out of the housing 1', and to close the motor circuit when the slider block 24 is in a set position in which the terminal prongs are retracted within the housing, as will also be presently explained in greater detail.

Figure 3:
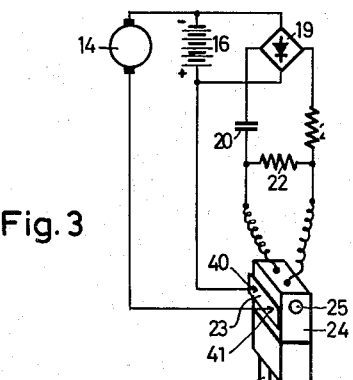
FIG. 3 is a schematic diagram of the electrical circuit of the shaver shown in FIG. 2.

Referring to the circuit diagram of FIG. 3, it will be seen that the bridge rectifier 19 is connected to the terminal prong 17 through the resistor 21, and to terminal prong 18 through the condenser 20 of suitable capacity.

The condenser 20 allows for the connection of the circuit to alternating current lines of widely varying voltages without any selective switching, or the like. For this purpose, the condenser 20 serves as a current limiting means and takes the place of a transformer which would normally be employed for such purposes. The condenser 20 is thus effective to limit the charging current supplied to battery 16 to a safe maximum value at the highest line voltage which would be encountered in charging, as for example, a 220 volt line voltage.

A resistor 22 is connected across the terminal prongs 17 and 18 to permit the leaking off of any residual charges which may remain in the condenser 20 after the re-charging unit is disconnected from the power source.

The motor 14 is connected to the storage battery 16 for energization thereby, through the conductive plate 23, as shown in FIG. 3. For this purpose, the circuit, connecting motor 14 with the storage battery 16, is provided with switch means, including spaced contacts 40, 41, which are bridged by the conductive strip 23 when the slider 24 is brought to its operative position.

Figure 4:
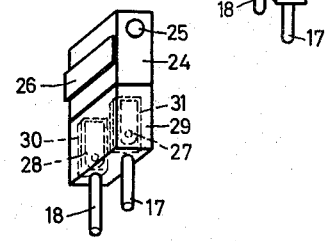
FIG. 4 is an enlarged perspective view of the slider and mounted terminal prongs, which slider is used in the shaver shown in FIG. 2.

FIG. 4 shows slider 24 in detail. The slider body is made of insulating material, as is its operating button 25. The contact bridging plate or bar 26 is affixed to one face of the slider. At its lower end, the slider 24 has fixedly mounted a pair of flat terminal prongs 27 and 28 which may be used for insertion into sockets or receptacles having elongated outlet openings shaped to receive such flat terminal prongs. These flat terminal prongs may be used for connecting the charging unit to line sockets or receptacles in the United States or other countries which employ sockets of the type described above. For other parts of the world, as in European countries, for example, where line sockets and receptacles have circular outlet openings, an adapter plug 29 is provided. As shown in FIG. 4, the adapter plug 29 has inlet openings, in which are contained contacts 30 and 31. The adapter plug 29 is preferably of the same shape as the slide housing 24, and is adapted to be inserted thereon as a continuation thereof, with the flat terminal prongs 27 and 28 contacting the interval contacts 30 and 31. The contacts 30 and 31 are connected to a pair of projecting cylindrical terminal prongs 17 and 18 which are sized to be received in the circular outlet openings of the European-type socket. Thus, the shaver of the instant invention is adapted to universal use throughout the world in any type of socket and for any line voltage.

Figure 5:
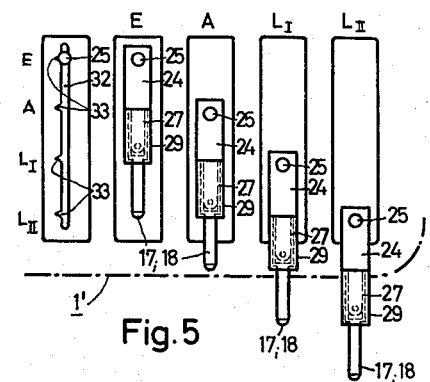
FIG. 5 is a schematic diagram illustrating the various and successive setting positions of the slider of FIGS. 2 and 4.

FIG. 5 is a diagrammatic view showing the slider in its various set positions, which are shown side-by-side for convenience and clarity of illustration. In the position E, the slider 24 is in its upper extreme position, with the switch formed by conductive plate 23 and contacts 40 and 41 closed. The shaver motor 14 is thus switched on and the shaver is ready for use.

The slider 23 is guided in the slot 32 by means of the operating button 25 which may register with slot notches 33 and be releasably held therein in the various positions of adjustment. When the button 25 is lowered in slot 32 to the next notch 33, corresponding to the position A, the slider is lowered until the conductive plate 23 is out of engagement with the contacts 40 and 41. In this position, shown in FIG. 2, the contact prongs 17 and 18 are still entirely inside the housing 1', that is to say, they do not project outside the housing. The position A therefore represents the "off" position of the shaver in which the motor 14 is disconnected from the battery 16.

When the slider 24 is moved into the next position, further down along slot 32, it will be arrested in position $L_I$, in which the prongs 17 and 18 project outwardly from housing 1', sufficiently to be plugged into a wall socket.

If the slider 24 is brought into position $L_{II}$, the adapter 29 projects from the housing 1'. This enables the connection to be made to deeply recessed safety sockets and receptacles. In addition, the position $L_{II}$ represents the position in which the shaver would be plugged into a socket designed to receive the flat type terminal prongs. For this purpose, the adapter 29 is removed, uncovering the flat prongs 27 and 28, which project from the housing 1' for plugging into the socket.

It will be observed in FIG. 2 that the slider 24 carrying terminal prongs 17, 18, is located adjacent one of the short side walls of the housing, and the prongs extend perpendicularly from the long bottom wall of the shaver housing. When the shaver is plugged into a wall socket, the center of gravity of the shaver will be located below the socket, and the housing will abut the wall and support itself there-against, so that the shaver will not fall out of the socket.

Figure 6:
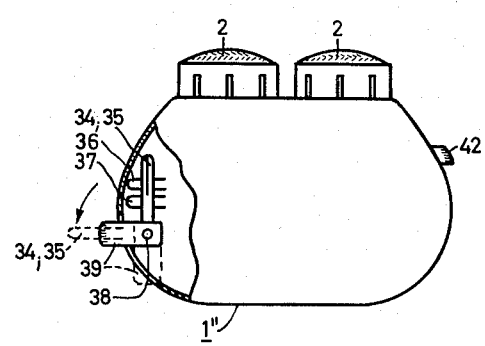
FIG. 6 is an elevational view of a double-head electric shaver similar to that shown in FIG. 2, but having a modified type of retractable terminal prong assembly.

FIG. 6 illustrates a shaver having fundamentally the same general design as the shaver shown in FIG. 2. Instead of the slidably extendable prongs 17 and 18, however, there is provided terminal prongs 34, 35, for connecting the charging unit. These prongs, 34, 35, are mounted on a pivot 38 for pivotal turning movement thereabout, and in this manner, the prongs 34, 35, may be swung to a retracted position within the housing 1" (as shown in full line in FIG. 6), and to an extended position projecting from the housing 1" (as shown in broken line in FIG. 6).

The motor circuit of the shaver of FIG. 6 includes a pair of contacts 36 and 37, which are normally connected by one of the terminal prongs 34 or 35, when the prongs are in their retracted position within the housing 1".

When the accumulator is to be charged, the prongs 34, 35 are swung out on pivot 38 by means of a handle member or knob 39 which is also pivoted on pivot 38 and is arranged at right angles to said terminal prongs. When the prongs 34, 35 are swung out to their extended positions, the circuit between the motor and storage battery is broken by removing the connection between contacts 36 and 37. This prevents the motor from running while the storage battery is being charged.

A switch operable by button 42 may be provided for de-energizing the motor when the shaver is to be stored away between operations, without the necessity of extending the terminal prongs.

While preferred embodiments of the invention have been shown and described herein, it is obvious that numerous additions, changes, and omissions may be made without departing from the spirit and scope of the invention.

What is claimed is:

1. Power pack means for supplying current to a portable electrical appliance having a housing, comprising a low-voltage drive motor in the upper portion of said housing, gas-tight storage-battery cells mounted in said housing beneath said motor, a control switch mounted on said housing and connecting said cells with said motor, a pair of connector members mounted on said housing for plug-in connection with an alternating-current utility-line outlet, a rectifier fixedly mounted in said housing and having output leads connected to said cells, impedance means comprising a capacitor, and a voltage divider circuit connected between said connector memberes to be energized by full power-line voltage and comprising said rectifier and said impedance means inclusive of said capacitor in direct and fixed series connection with each other and fixedly mounted in said housing, whereby said cells are chargeable through said voltage divider circuit from different line voltages.

2. Power pack means according to claim 1, comprising a resistor mounted in said housing and connected across said two plug pins, said resistor and said impedance means forming together with said rectifier a closed loop circuit for discharging said capacitor.

3. Power pack means according to claim 1, said connector members consisting of plug pins and being movably mounted in said housing for movement between an extended position in which they protrude from the housing and a retracted position in which they are wholly contained within said housing.

4. Power pack means according to claim 1, said connector members consisting of plug pins and being movable between an extended position in which they protrude from the housing and a retracted position in which they are wholly contained within said housing, and switching means including said plug pins and being operable to disconnect said cells from said motor when said pins are in said extended position.

5. Power pack means according to claim 1, said connector members consisting of plug pins, a slide member carrying said plug pins and being movable in said housing from a position in which said pins project from said housing to a position in which said pins are wholly contained within said housing, a contact member positioned on said slide member to connect the said motor with said cells when said member is in said one position, and to disconnect said motor from said cells when said pins are in said other position.

6. Power pack means according to claim 1, said connector members consisting of plug pins, a slide member carrying said plug pins and being movable in said housing from a position in which said pins project from said housing to a position in which said pins are wholly contained within said housing, a contact member positioned on said slide member to connect said motor with said cells when said member is in said one position and to disconnect said motor from said cells when said pins are in said other position, said housing having an elongated slot and said slide member having a finger button extending through said slot to the outside of said housing for manually shifting said button along said slot to move said slide member to said respective positions, said slot having lateral notches at respective locations corresponding to said respective positions of said slide member and serving to receive and releasably hold said finger button.

7. Power pack means for supplying current to a portable electrical appliance having a housing, comprising a low-voltage direct-current motor mounted in the upper portion of said housing, a pile of series connected gas-tight storage cells having a total direct-current voltage adapted to that of said motor, a control switch connecting said cells with said motor, a pair of connector members mounted on said housing for plug-in connection with an alternating-current utility-line outlet, a full-wave rectifier mounted in said housing and having output leads connected to said cells, a line-voltage divider circuit connected in said housing between said two connector members to be impressed by full line voltage and consisting essentially of a resistor and a current-limiting capacitor connected directly in series with said rectifier, said voltage divider being rated for charging said cells from respectively different line voltages.

8. Power pack means for supplying current to a portable electrical appliance having a housing, comprising a low-voltage motor in the upper portion of said housing, gas-tight storage-battery cells mounted in said housing beneath said motor, a control switch connecting said cells with said motor, a pair of connector plug pins rigidly mounted on said housing and protruding externally from the bottom side thereof and adapted for direct insertion into an alternating-current utility-line outlet, a hollow cap removably attached to said housing at said bottom side to normally cover said plug pins and having a curved contour to form a continuation of said housing, a rectifier mounted in said housing and having output leads connected to said cells, impedance means comprising a capacitor, and a voltage divider circuit connected between said plug pins to be energized by full power-line voltage and comprising said rectifier and said impedance means inclusive of said capacitor in series with each other.

References Cited in the file of this patent

UNITED STATES PATENTS

| | | |
|---|---|---|
| 1,954,931 | Hambuechen | Apr. 17, 1934 |
| 1,993,914 | Bohm | Mar. 12, 1935 |
| 2,217,519 | Meyer | Oct. 8, 1940 |
| 2,339,831 | Andersen | Jan. 25, 1944 |
| 2,369,198 | Wyse | Feb. 13, 1945 |
| 2,628,339 | Werner | Feb. 10, 1953 |
| 2,642,520 | Coolidge et al. | June 16, 1953 |
| 2,773,306 | Ranson | Dec. 11, 1956 |
| 2,809,424 | Villeneuve | Oct. 15, 1957 |
| 2,867,039 | Zach | Jan. 6, 1959 |
| 2,880,306 | Witte | Mar. 31, 1959 |

FOREIGN PATENTS

| | | |
|---|---|---|
| 526,362 | Great Britain | Sept. 17, 1940 |

OTHER REFERENCES

Ser. No. 427,480, Zdansky (A.P.C.), published June 15, 1943 (abandoned).